United States Patent [19]
Caprara et al.

[11] Patent Number: 5,912,912
[45] Date of Patent: Jun. 15, 1999

[54] REPETITIVELY-PULSED SOLID-STATE LASER HAVING RESONATOR INCLUDING MULTIPLE DIFFERENT GAIN-MEDIA

[75] Inventors: Andrea Caprara, Menlo Park; Luis A. Spinelli, Sunnyvale, both of Calif.

[73] Assignee: Coherent, Inc., Santa Clara, Calif.

[21] Appl. No.: 08/924,176

[22] Filed: Sep. 5, 1997

[51] Int. Cl.$^6$ .................................................. H01S 3/10
[52] U.S. Cl. .................. 372/25; 372/22; 372/92; 372/101; 372/107
[58] Field of Search ................... 372/25, 32, 20, 372/21, 22, 33, 92, 98, 10, 107, 101

[56] References Cited

U.S. PATENT DOCUMENTS

| | | | |
|---|---|---|---|
| 5,243,615 | 9/1993 | Ortiz et al. | 372/34 |
| 5,272,713 | 12/1993 | Sobey et al. | 372/69 |
| 5,412,683 | 5/1995 | Nighan, Jr. et al. | 372/75 |
| 5,699,376 | 12/1997 | Richmond | 372/68 |

FOREIGN PATENT DOCUMENTS

| | | | |
|---|---|---|---|
| 59195892 | 11/1984 | European Pat. Off. | H01S 3/05 |
| WO 97/07575 | 2/1997 | WIPO | H01S 3/0941 |

OTHER PUBLICATIONS

G.V. Vdovin & S.A. Chetkin, "Active correction of thermal lensing in solid–state lasers. II. Use of a resonator with a controllable configuration," *Quantum Electronics*, 23 (2), Feb. 1993, pp. 141–145.

N. Pavel, T. Dascalu & V. Lupei, "Two rods VRM–unstable resonator versus single rod unstable resonator with amplifier stage," *Proceedings (SPIE—The International Society for Optical Engineering)*, a Laser Optics '95 conference on Solid State Lasers, Jun. 27 ≦Jul. 1 1995, vol. 2772, pp. 200–208.

N. Pavel, T. Dascalu, V. Lupei, "Variable reflectivity mirror unstable resonator with deformable mirror thermal compensation," *Optics Communications*, vol. 123, Jan. 15, 1996, pp. 115–120.

S.A. Chetkin, G.V. Vdovin & K. Ueda, "Intracavity Adaptive Optics for a Powerful Nd:YAG Laser," *Laser Physics*, vol. 5, No. 6, 1995, pp. 1189–1198 (No Month).

Li Yan & Lei Ding, "Intracavity injection lasing in a hybrid neodymium laser," *Applied Physics Letters*, vol. 67, No. 25, Dec. 1995, pp. 3679–3681.

Wei–Lou Cao, Chi H. Lee, Li Yan & Michael Wraback, "A Diode–Pumped Hybrid Nd:Phosphate Glass and Nd:YVO$_4$ Laser," *Technical Digest* (12th Topical Meeting), Jan. 27–29, 1997, 5 pages in lenth (TuC2–171 through TuC2–173).

*Primary Examiner*—James W. Davie
*Attorney, Agent, or Firm*—Limbach & Limbach L.L.P.

[57] ABSTRACT

A continuously-pumped, repetitively-pulsed, Q-switched laser resonator includes two different gain-media which lase at about the same wavelength. By separately and variably pumping the different gain-media, the laser resonator can efficiently generate output radiation having parameters which stay constant over a much wider range of pulse-repetition frequency than would be possible were either one of the gain-media solely deployed in the resonator. In one embodiment, the laser resonator includes an arrangement for providing near real-time compensation for variations in thermal-lensing in the gain-media resulting from variations in pump-power or pulse-repetition frequency.

20 Claims, 7 Drawing Sheets

REPETITIVELY-PULSED SOLID-STATE LASER HAVING RESONATOR INCLUDING MULTIPLE DIFFERENT GAIN-MEDIA

TECHNICAL FIELD OF THE INVENTION

The present invention is related in general to repetitively-pulsed solid state lasers. It is related in particular to a laser system wherein a continuously-pumped, Q-switched resonator delivers a stream infrared laser-radiation pulses.

DISCUSSION OF BACKGROUND ART

A preferred prior-art laser resonator type for providing a stream of laser-radiation pulses for several laser applications is a continuously-pumped, repetitively-pulsed, Q-switched, resonator. In a particularly preferred such prior-art resonator type, continuous pumping is typically provided by a plurality of laser-diodes, to a solid-state gain-medium such as Nd:YAG, Nd:YVO$_4$, Nd:YLF or the like. Resonators including these gain-media provide fundamental laser-radiation at infrared (IR) wavelengths which, according to a particular application, can be conveniently converted to radiation at shorter-wavelengths by one or more frequency doubling or mixing steps in optically non-linear media (crystals). Such a resonator type can be efficient and compact, for example with resonator length of about 0.5 meters (m), or less. The resonator can be folded to reduce its overall physical dimension or to facilitate pumping.

Above described general advantages in efficiency, size, and wavelength-flexibility notwithstanding, any one prior-art, repetitively-pulsed laser resonator arrangement is limited in the range of pulse-parameters or pulse repetition frequencies (pulse-frequencies) which can be efficiently delivered. These ranges are determined by characteristic properties of a particular gain-medium, in particular excited state lifetime ($\tau$) and gain cross-section ($\sigma$). Should a potential laser application demand pulsed laser-radiation having pulse and frequency parameters which can not be efficiently provided by a known gain-medium, then the application can at best be inefficiently satisfied.

For any particular pulse-parameter or frequency range, the range of efficient power-output available may be limited by thermal-lensing in whatever gain-medium is selected. Thermal-lensing is refractive power induced in the gain-medium due to refractive-index change with temperature increase resulting from absorbed pump-power. Thermal-lensing can vary significantly with variations of absorbed power, and also with variations in pulse-frequency. While optical components of a resonator can be selected to compensate for a particular level thermal-lensing, the configuration is typically effective for only a limited range of pump-power and pulse-frequency.

There is a need for a laser resonator arrangement which overcomes above discussed limitations on laser performance imposed by gain-medium characteristics. Preferably such an arrangement should also include means for actively compensating for variations in thermal-lensing in a gain-medium.

SUMMARY OF THE INVENTION

The present invention is directed to a continuously-pumped, repetitively-pulsed laser. The laser includes a laser-resonant cavity. Disposed in the resonant cavity are first and second solid-state gain-media, the solidstate gain-media being different, one form the other.

In one aspect, the present invention provides that by including two or more different gain-materials in a single resonator, and independently and variably pumping these gain-media, pulse-frequency dependent laser output parameters can be provided in essentially any range between limiting ranges characteristic of either of the gain-media alone.

One application to which the present invention is applicable is frequency multiplication for converting pulsed radiation at a fundamental IR wavelength to ultraviolet (UV) radiation. The efficiency of frequency multiplication in optically non-linear media is proportional to the product of peak power ($P_{peak}$) and average power ($P_{ave}$) in the pulsed radiation being frequency multiplied. By way of example, in a Nd:YAG resonator, this peak-average product peaks sharply at a pulse-frequency of about 7 KHz. In a Nd:YVO$_4$ resonator, the peak-average product peaks sharply at a pulse-frequency of about 25 KHz. This leaves a wide range of pulse-frequencies over which efficient frequency conversion is not practically possible. It has been found by experiment that using both gain-media, serially arranged in a resonator, provides pulsed radiation for which the product of peak power and average power peaks at an intermediate pulse-frequency between the higher and lower pulse-frequencies. By separately and differentially pumping the gain-media it is possible to locate the peak-average power product anywhere between the peaks for the individual gain-media.

In another aspect of the present invention, means are provided for compensating for variations in thermal-lensing due to variations in pump-power or pulse-frequency. The laser resonator is formed by first and second mirrors. The compensation means includes replacing one of the resonator mirrors with a system of a mirror and a positive lens, the mirror and positive lens having variable separation therebetween. Varying the separation between the mirror and the positive lens causes the system to act as a single resonator mirror having variable catoptric power.

The mirror-lens system can be actively controlled by providing an arrangement for detecting a spot-size change (due to a change in thermal-lensing) of a beam circulating in the resonator, and generating from the detected spot-size change a signal which varies the separation of the plane mirror and positive lens, thereby compensating for the change.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain the principles of the invention.

DETAILED DESCRIPTION OF THE INVENTION

Figure 1:
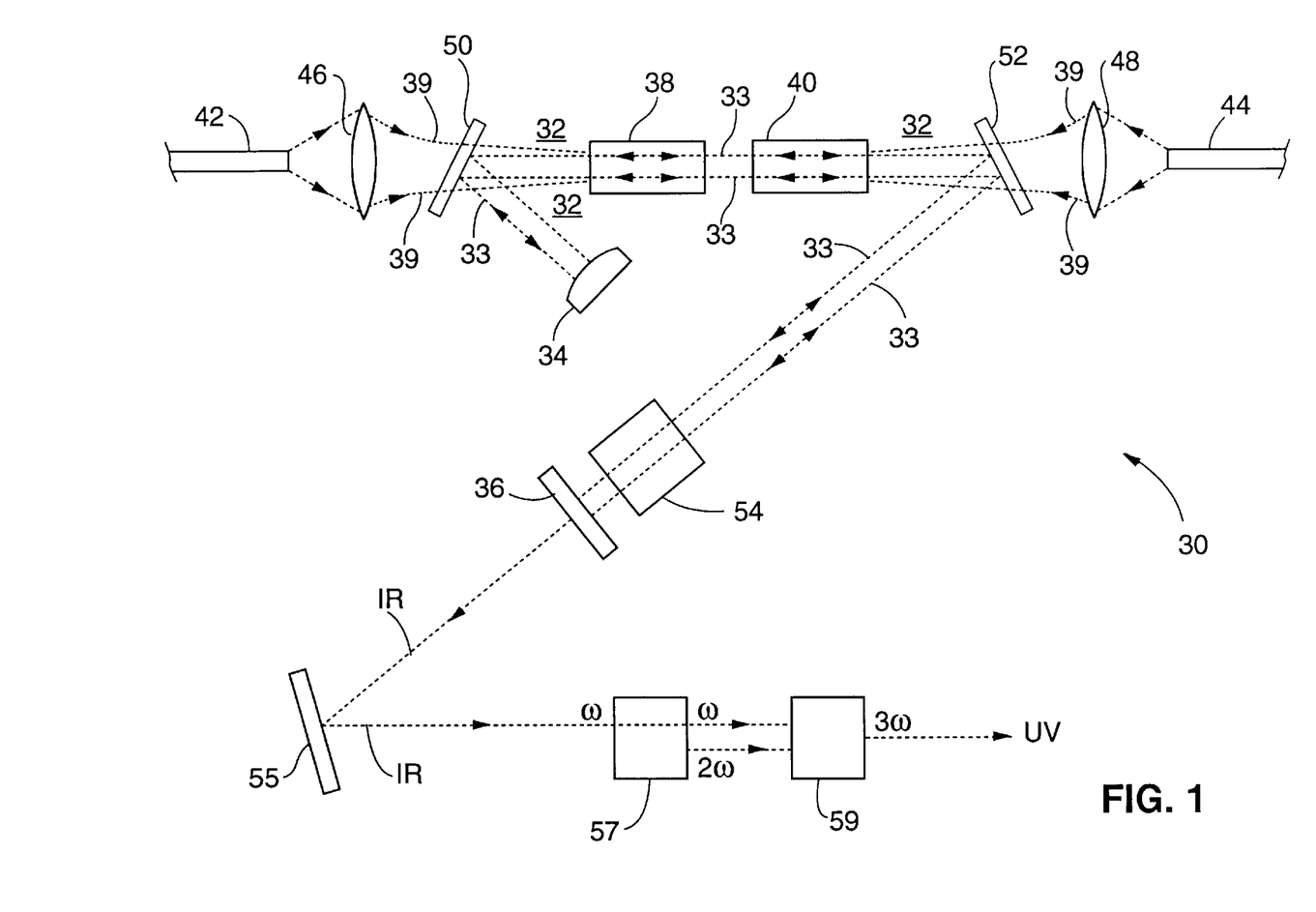
FIG. 1 schematically illustrates one preferred embodiment of a repetitively-pulsed Q-switched laser system in accordance with the present invention, having a resonant cavity including two different gain-media.

Turning now to the drawings, wherein like components are designated by like reference numerals, FIG. 1 depicts one preferred embodiment of a continuously-pumped, repetitively-pulsed, Q-switched laser system 30 in accordance with the present invention. Laser system 30 includes a three-arm or X-folded resonator 32 formed between mirrors 34 and 36. Laser-radiation circulates within the resonator as indicated schematically by rays 33. Mirror 36 is partially transparent and functions as an output coupling mirror of resonator 32. Located in resonator 32 are first and second gain-media (rods) 38 and 40 respectively. Rods 38 and 40 are formed from different materials having different characteristic (excited-state) lifetimes or different gain cross sections, but which lase at about the same wavelength.

During operation of laser system 30, pump radiation 39 is provided continuously by first and second diodelaser arrays or bars (not shown), the collective output of which is directed by fibers 42 and 44 and focussing lenses 46 and 48 respectively, via resonator fold-mirrors 50 and 52, to rods 38 and 40 respectively. Fold mirrors 50 and 52, of course, are provided with a coating which reflects laser-radiation 33 and transmits pump light 39. A radio-frequency (RF) driven acousto-optic Q-switch 54 is located in resonator 32 proximate output coupling mirror 36. While RF power is applied to Q-switch 54, lasing in resonator 32 is inhibited. Repetitively turning RF power on and off at a particular frequency causes resonator 32 to generate laser pulses at the same (pulse) frequency. A fold-mirror 55 directs output IR radiation (at fundamental radiation frequency ω) to a first non-linear crystal for frequency doubling (ω to 2ω). The doubled frequency is then mixed with the fundamental frequency in a second non-linear crystal 59 to provide frequency-tripled radiation (3ω).

In a preferred example of resonator 30, mirror 36 is a plane mirror and mirror 34 is a convex mirror having a radius of curvature of about 20.0 cm. Rod 40 is a 0.6%-doped Nd:YVO$_4$ rod having about 3.0 mm×3.0 mm cross-section and a length of about 7.0 mm. Rod 38 is a 1.0%-doped Nd:YAG rod having about 3.0 mm×3.0 mm cross-section and a length of about 10.0 mm. Mirror 34 is preferably placed as close as possible to rod 38, a distance of about 2.0 to 3.0 cm (of folded path) being sufficient to allow for placement of fold mirror 50. Overall resonator (folded path) length is about 22.0 cm. Non-linear crystals 57 and 59 are lithium borate (LBO) crystals.

The form and exemplified component specifications of resonator 32 should not be considered limiting. From a detailed description of principles of the present invention presented hereinbelow, those skilled in the art may devise a wide range of resonator configurations, folded or unfolded, using the same or different combinations of gain media, either end-pumped or transversely-pumped, and differently Q-switched. Those skilled in the art will also recognize that applications of the present invention are not limited to those including frequency multiplication. Further, the present invention is not limited to deploying only two gain media in a resonator. Three are more different media may be included, provided those media lase at about the same wavelength.

It is emphasized here that providing rods 38 and 40 of different gain materials to provide in effect a "hybrid gain-medium" should not be confused with prior-art polarization Q-switched resonator arrangements in which two rods of the same gain material have been provided to compensate for thermally-induced birefringence. In these prior-art arrangements, those resonator parameters which are limited by the gain-medium are essentially the same whether one or two rods are employed. The manner in which different gain-material characteristics can be combined in a supplementary manner in a two-rod resonator in accordance with the present invention is described below with reference to FIGS. 2–8.

Figure 2:
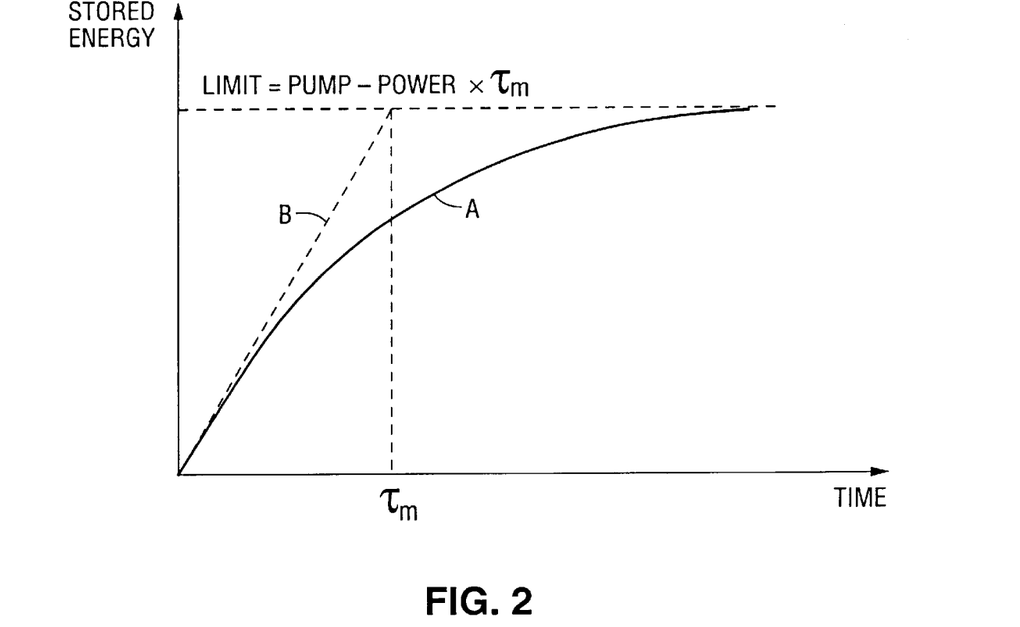
FIG. 2 is a graph schematically illustrating buildup of stored energy in a continuously pumped gain-medium with time following initiation of pumping.

Referring first to FIG. 2, curve A schematically illustrates build-up of stored energy in a continuously pumped arbitrary gain-medium or gain-material (m) with time. Stored energy builds up initially about linearly and relatively sharply with time, and then builds-up decreasingly sharply toward a limiting value which is the product of pump-power and characteristic lifetime $\tau_m$ of the material. $\tau_m$ corresponds approximately to the intersection of an extension (line B) of the linear portion of curve A with the limiting value of stored energy.

Figure 3:
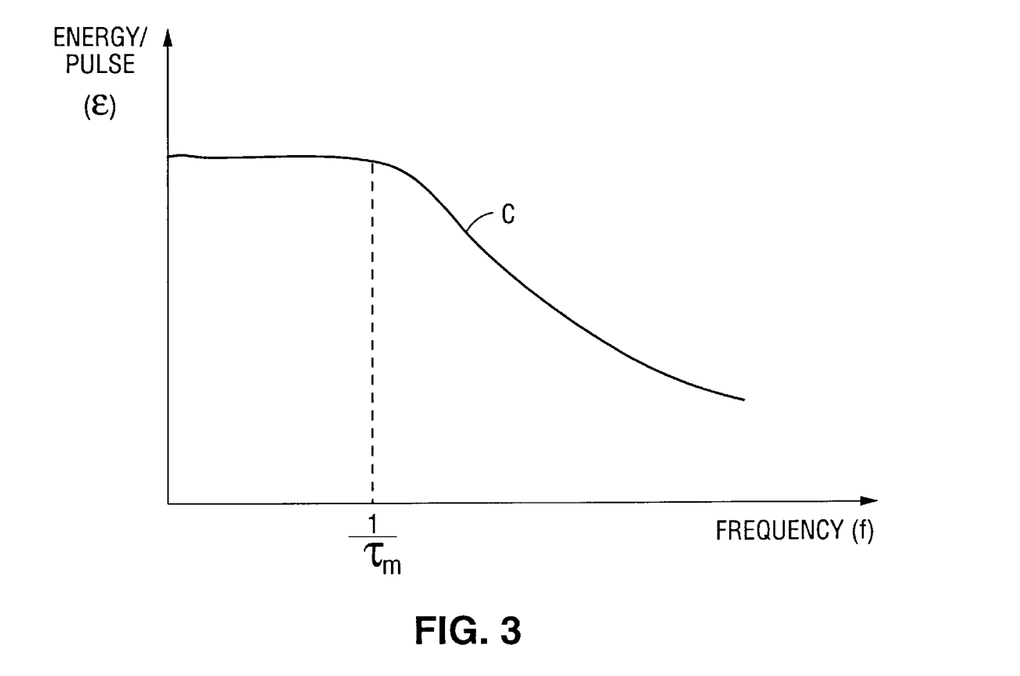
FIG. 3 is a graph schematically illustrating variation of energy-per-pulse with pulse-frequency in the gain-medium of FIG. 2.

Referring to FIG. 3 curve C schematically illustrates the variation of energy-per-pulse (ε) as a function of pulse-frequency (f). This stays essentially constant up a to a frequency of about $1/\tau_m$ and decreases with pulse-frequency thereafter. Average output power, being the product of energy-per-pulse and pulse-frequency, will increase with pulse-frequency initially linearly through a pulse-frequency region 0 to $1/\tau_m$ (corresponding to the nearly constant portion of curve C) and then rise decreasingly with increasing pulse-frequency.

Figure 4:
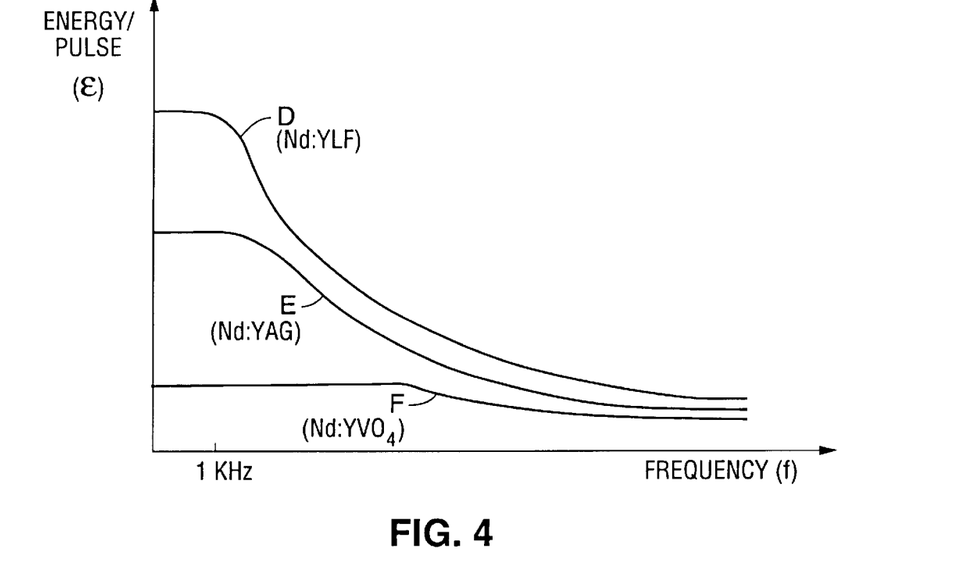
FIG. 4 is a graph schematically illustrating relative variation of energy-per-pulse with pulse-frequency for YLF, Nd:YAG and Nd:YVO$_4$.

Referring to FIG. 4, relative energy-per-pulse as a function of frequency is illustrated for Nd:YLF, (curve D) Nd:YAG (curve E) and Nd:YVO$_4$ (curve F). In the graph of FIG. 4 as in other comparative graphs discussed below, it is assumed that the materials are pumped at the same power in the essentially the same resonator configuration. Nd:YLF, Nd:YAG and Nd:YVO$_4$ have characteristic lifetimes of about 500, 230, and 90 microseconds (μs) respectively. Relative gain cross-sections for the three materials, in arbitrary units, are about 2, 3, and 15 respectively. Nd:YLF can provide the highest energy-per-pulse but this falls sharply with pulse-frequency beyond about 1 KHz. Nd:YVO$_4$ provides the lowest maximum energy-per-pulse, this can be maintained, however, up to a pulse-frequency of about 10.0 KHz, and falls only gradually with pulse-frequency thereafter. Nd:YAG has a energy-per-pulse versus pulse-frequency characteristic which is Intermediate that of Nd:YLF and Nd:YVO$_4$.

Figure 5:
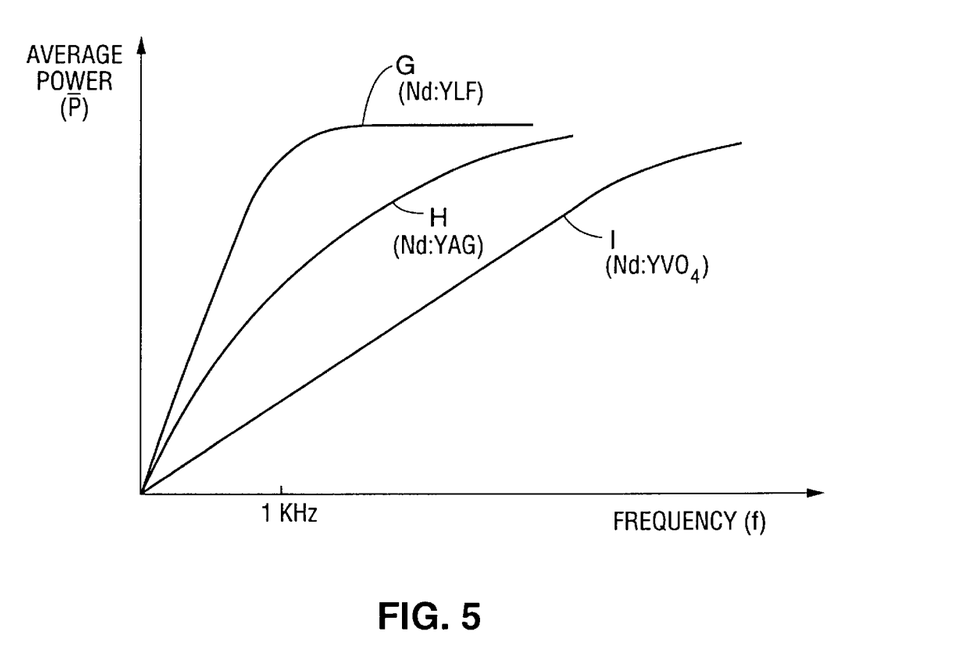
FIG. 5 is a graph schematically illustrating relative variation of average power with pulse-frequency for YLF, Nd:YAG and Nd:YVO$_4$.

From FIG. 5 it can be seen that Nd:YLF (curve G) can provide a nearly constant maximum average power at pulse-frequencies above 1 KHz, while Nd:YAG (curve H) and Nd:YVO$_4$ (curve I) rise to maximum average power at increasingly longer frequencies.

Figure 6:
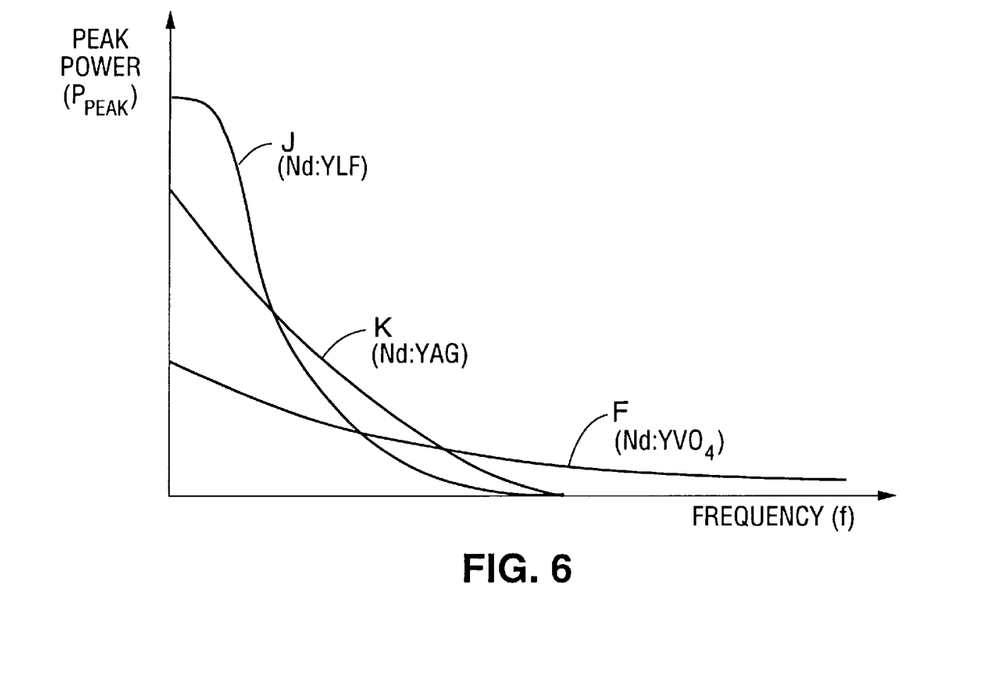
FIG. 6 is a graph schematically illustrating relative variation of peak power with pulse-frequency for YLF, Nd:YAG and Nd:YVO$_4$.

Referring to FIG. 6, it can be seen that regarding peak-power as a function of frequency, characteristics of Nd:YLF, Nd:YAG and Nd:YVO$_4$ compare in a similar manner to energy-per-pulse characteristics of FIG. 3, with Nd:YLF (curve J) providing the highest peak power and Nd:YAG (curve K) and Nd:YVO$_4$ (curve L) providing less peak power but with decreasingly sharper fall of peak power with frequency.

Which of the above discussed frequency-dependent characteristics is of particular importance depends on a particular application. In prior-art lasers this is a major consideration in selecting a particular gain-medium. It can be seen from the graphical representation of exemplary laser material characteristics, however, that characteristics of individual gain-materials can vary significantly, leaving significant gaps therebetween. Because of this, there may be applications for which no individual gain-material provides an ideal set of characteristics.

In a laser system in accordance with the present invention, by including two different gain-materials in a single resonator, particularly a resonator such as resonator 30 of FIG. 1 in which the gain-media can be individually and thus selectively pumped, it is possible to generate laser-radiation having parameters which lie essentially anywhere between the parameters of laser-radiation generated by employing any of the gain-media alone. One example of "engineering" a laser system characteristic using the method of the present invention is set forth below. This example relates particularly to meeting laser-radiation requirements for machining printed circuit boards using UV-laser-radiation.

First it is instructive to consider those laser-radiation parameters which are important in generating UV-radiation from IR-radiation by frequency conversion in optically non-linear materials. In frequency doubling, the average power available at the doubled frequency (2ω) is about equal to some constant times the product of the peak and average powers at the fundamental frequency (ω). In a similar manner, the product of peak and average powers at the fundamental frequency also determines optimum conversion of the doubled frequency to the trebled frequency (3ω) by mixing the fundamental and doubled frequencies.

Figure 7:
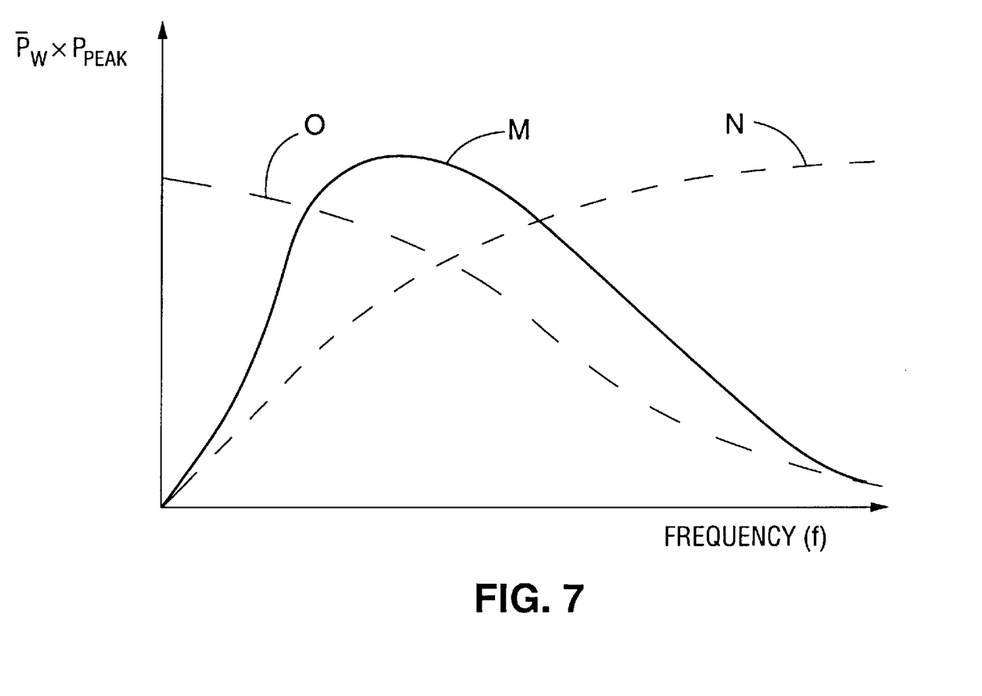
FIG. 7 is a graph schematically illustrating relative variation of peak power, average power, and the product of peak and average power with pulse-frequency for an arbitrary gain-material.
Figure 8:
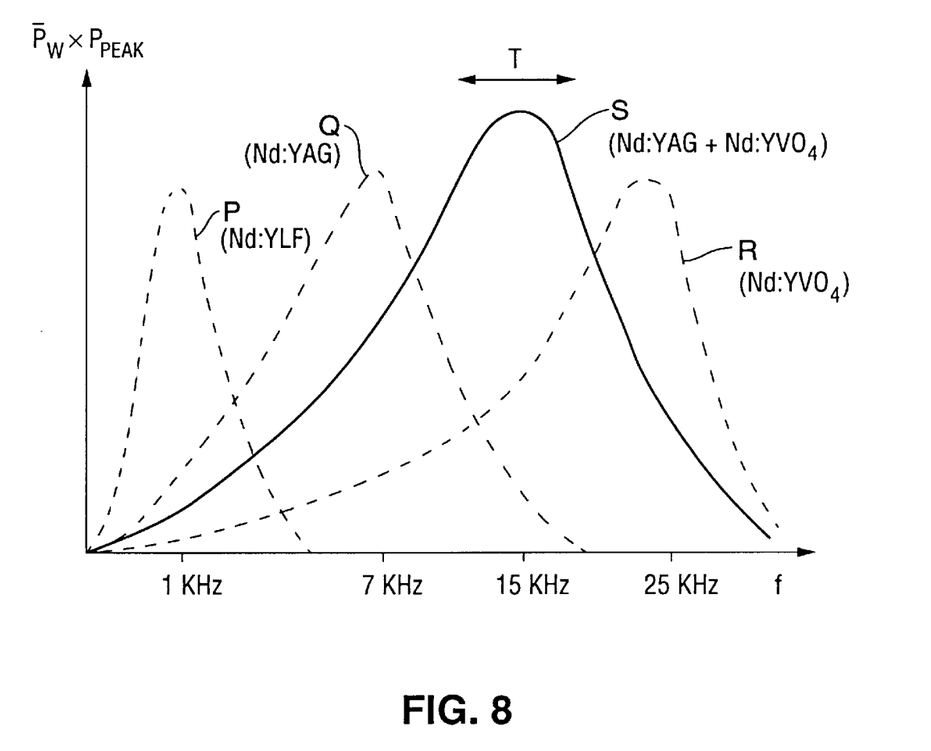
FIG. 8 is a graph schematically illustrating relative variation of the product of peak and average power with pulse-frequency for YLF, Nd:YAG and Nd:YVO$_4$, all compared with the variation of the product of peak and average power for a resonator including both Nd:YAG and Nd:YVO$_4$ gain-media.

Referring first to FIG. 7, the general form (curve M) of the product and peak and average power as a function of pulse-frequency is schematically illustrated. Corresponding average (dashed curve N) and peak (dashed curve O) functions, the general form of which is schematically illustrated in FIG. 5 and FIG. 6 respectively, illustrate why the peak-average power product rises from zero to a peak, and falls back to zero or near-zero. Referring next to FIG. 7, dashed curves P, Q and R schematically illustrate normalized peak-average power product as a function of pulse-frequency for Nd:YLF, Nd:YAG and Nd:YVO$_4$ respectively. It can be seen that the curves are sharply peaked at pulse-frequencies of about 1 KHz, 7 KHz, and 25 KHz respectively, leaving significant voids therebetween.

While UV laser machining of printed circuit board materials such as copper, epoxy-resin and epoxy-impregnated fiberglass, may be performed at a pulse-frequency of 7 KHz at a wavelength of about 0.355 μm, it would be preferable to perform the machining at a higher pulse-frequency. However, while, as illustrated in FIG. 7, conversion efficiency of Nd:YVO$_4$ radiation peaks at a pulse-frequency of about 25 KHz, the energy-per-pulse available is near or below an ablation threshold for materials to be machined. This threshold must be exceeded in order to perform the machining.

By including both Nd:YAG and Nd:YVO$_4$ gain-media in a resonator 30 it has been found possible to generate 1.064 μm fundamental laser-radiation having a peak-average power product (frequency-conversion peak efficiency) which peaks at a pulse-frequency between that for the individual gain materials. It has also been found that by varying the ratio of pump-powers delivered by fibers 42 and 44 to the different gain-media, the frequency-conversion efficiency peak can be moved to higher or lower pulse-frequencies depending on whether the Nd:YVO$_4$ or Nd:YAG gain-medium is pumped at the higher power. Surprisingly, it has further been observed that, at least at a frequency of about 15 KHz, higher peak conversion efficiency is obtained with rods of the two different gain-media than would be obtained with two rods of the same gain-medium. In one example, pumping Nd:YAG and Nd:YVO$_4$ gain-media with about 10 Watts each provide an average power of about 2.5 Watts at 355 nm of about 15 KHz. The 15 KHz frequency has been found ideal for laser machining with 0.355 μm radiation.

From the description presented above, it can be seen by deploying different gain-media in what may be termed a "hybrid" laser resonator, the resonator output parameters need no longer be limited by the characteristics of a particular gain-medium. Varying pump-power delivered to the different gain-media provides a means for varying the "hybrid" resonator output parameters. However, all gain-media exhibit some degree of thermal-lensing, which varies to some degree with pump-power and pulse-frequency. In prior-art resonators, thermal-lensing is fixedly compensated by anticipating the dioptric power due to thermal-lensing and selecting appropriate optical parameters of the resonator mirrors, or providing curved entrance or exit surfaces (ends) on the gain-medium (rod). Accordingly, prior-art resonators can only operate with optimum bean quality at fixed, or at best marginally variable, pump-power and hence output-power.

In order to take maximum advantage of principles of the present invention, it is preferable to provide resonator for which output parameters including power and pulse-frequency are essentially infinitely and separately variable (between limits imposed by the different gain-media) at an essentially constant beam quality. In this regard, it would be advantageous to provide a means for actively compensating for variation thermal-lensing effects in gain-media. A description of one such means is set forth below with reference to FIG. 9.

Figure 9:
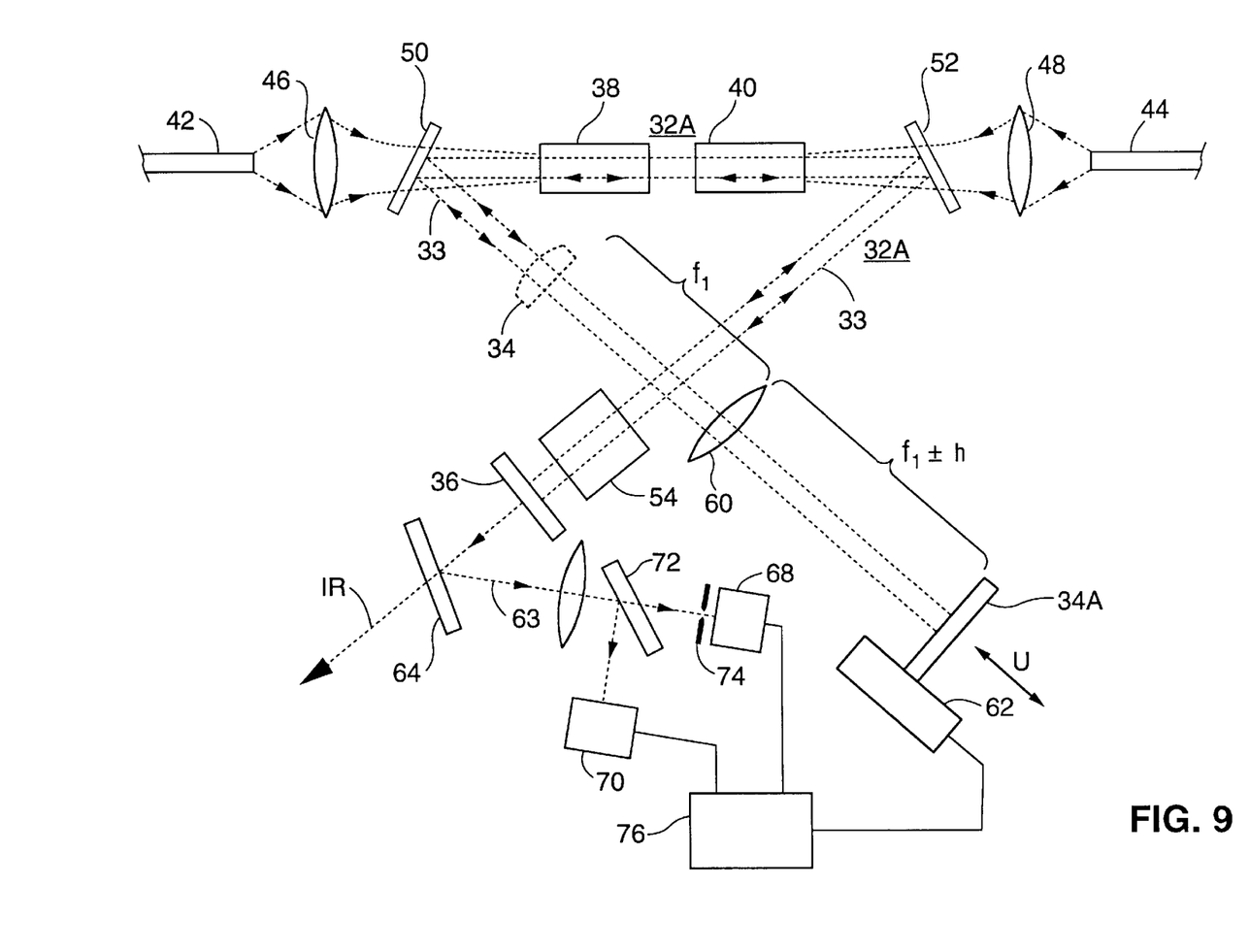
FIG. 9 schematically illustrates another preferred embodiment of a laser system in accordance with the present invention having a resonator including one preferred embodiment of active means for compensating for variations of thermal-lensing in gain-media.

Schematically illustrated in FIG. 9 is another preferred embodiment 31 of a laser system in accordance with the present invention. Laser system 31 includes a resonator 32A, which is similar to resonator 32 (see FIG. 1) with the exception that convex mirror 34 of resonator 32, the original position of which is indicated in phantom in FIG. 9, has been replaced with a folded optical relay arrangement 58. Relay arrangement 58 includes a positive lens 60 having a focal length $f_1$ and a plane mirror 34A spaced apart from lens 60 by a distance $f_1 \pm h$. Mirror 34 in fact forms one end of resonant cavity 32A. Mirror 34A is mounted on a linear translation stage which allows h to be continuously varied, as indicated by arrows U.

When relay system 58 is located such that lens 60 thereof is at a distance f1 from the original position of mirror 34, the system provides the equivalent of a single mirror located at the original position of mirror 34 and having a radius of curvature R* given by $$R^* = f_1^2/h \quad (1)$$

which means that the "equivalent single mirror" is variable in curvature from concave (when h>0) to convex (when h<0). In one example of relay system 58 (compatible with above described exemplary specifications of resonator 32), lens 60 has a focal length of about 8.9 cm, and $f_1 \pm h$ varies from about 3.0 cm to 8.0 cm between pumping extremes. This example, however, should not be considered as limiting.

In a resonator configuration of the type illustrated in FIG. 1, it is usual to select resonator mirrors and any anticipated thermal-lensing such that the laser beam spot (mode) size at the pumped-end of a gain-medium rod has a particular relationship to the size of the pump beam at the same position. The spot-size at output coupling mirror 36 varies monotonically and predictably with variations in thermal-lensing in gain-media through a desired spot-size. Accordingly, in system 31, by detecting changes in laser-beam spot-size, changes in thermal-lensing can be detected and then compensated by displacing mirror 34 in an appropriate direction.

In system 31, spot-size changes are detected by sampling a portion 63 of output beam (IR) using a partially reflecting mirror 64. A lens 66 re-images the diameter of resonating beam 33 at mirror 36 in a 1:1 ratio onto a photodiode 68 and, by means of a partially reflecting mirror 72, onto a photodiode 70. Mirror 72 is preferably about equally reflective and transmissive for laser light at fundamental frequency ω.

Photodiode 70 sees a full equivalent image which will vary in size with variations in thermal-lensing. Nevertheless, a signal produced by photodiode 70 represents the full power in that image. A pinhole aperture 74 is provided in front of photodiode 68 such that the portion of an image incident thereon is fixed. As the size of the equivalent image on the pinhole aperture increases or decreases, photodiode 68 will see a lesser or greater portion of power in the image. Accordingly, the ratio of signals provided by photodiodes 68 and 70 provide a measure of spot-size. Processing electronics 76 detect the ratio of signals generated by photodiodes 68 and 70 in response to the incident sampled beam. A nominal target ratio, predetermined by selection of pinhole aperture 74, represents a desired laser beam spot-size. An increase or decrease in that ratio is interpreted by processing electronics 76 as respectively a decrease and increase in dioptric power of thermal-lensing. Processing electronics 76 provide a signal to translation stage 62 to move mirror 34A respectively away from or toward lens 60 to compensate for the thermal-lensing change and restore the desired beam spot size.

Figure 10:
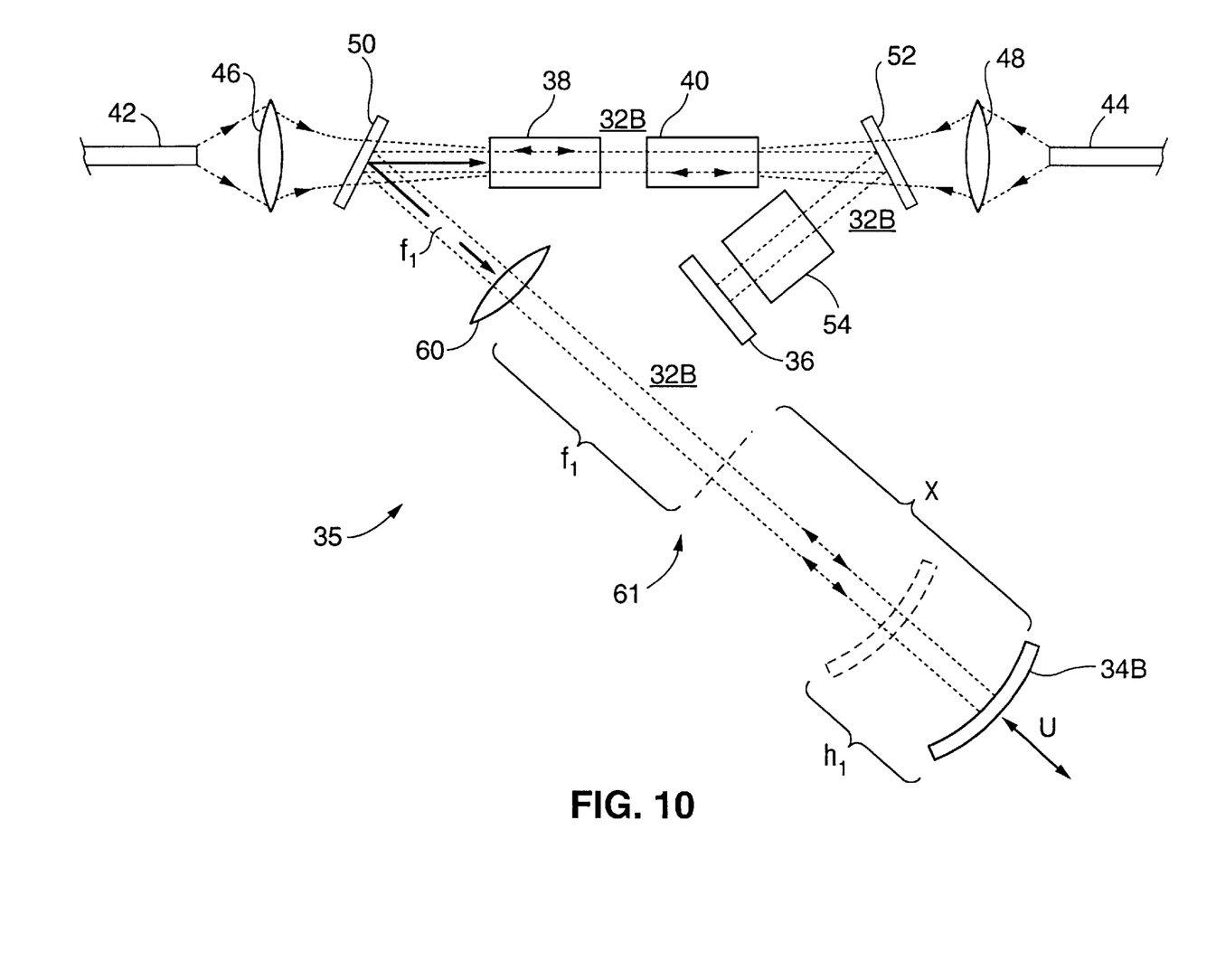
FIG. 10 schematicalLy illustrates yet another preferred embodiment of a laser system in accordance with the present invention having a resonator including another preferred embodiment of active means for compensating for variations of thermal-lensing in gain-media.

Referring now to FIG. 10, another preferred embodiment 35 of a laser system in accordance with the present invention, including means for compensating for thermal-lensing variations in gain media, is illustrated. System 35 includes a resonator 32B which is similar to resonator 32 of FIG. 1, with the exception that convex mirror 34 of resonator 32 has been replaced with a system 61 including a positive lens 60 and a concave mirror 34B. Output coupling plane-mirror 36 has been moved as close as possible to rod 40 as fold mirror 52 and Q-switch 54 permit. Lens 60 of optical system 61 is located a (folded path) distance of about one focal length ($f_1$) of the lens. Spacing between concave mirror 34B and lens 60 is variable, as indicated by arrows U. Concave mirror 34B of optical system 61 is located, for any given mode of operation of resonator 32B, at a distance $f_1 + X - h_1$ from lens 60, where $h_1$ is a variable $\geq 0$, and X is one half of the radius of curvature of concave mirror 34B. If, at any instant in the operation of resonator 32B, thermal lensing due to gain-media (rods) 38 and 40 provides a combined dioptric-power equal to $1/f_{thermal}$ (where $f_{thermal}$ is the equivalent focal length of the gain-media considered as a single lens), distance h, is given by:

$$h_1 = f_1^2/f_{thermal} \quad (2)$$

from which it can be seen that distance X, and, accordingly, the radius of curvature of mirror 34B, is preferably selected to correspond to at least the maximum thermal-lensing anticipated in operation of resonator 32B. By way of example, if lens 60 has a focal length of 10.0 cm and a maximum value of $f_{thermal}$ of about 10.0 cm is anticipated then mirror 34B preferably has a radius of curvature of about 20 cm.

In any event, as focal length $f_1$ is known, and $f_{thermal}$ is initially predictable and at any instant can be determined as described above from a determination of laser beam spot-size, determination of a suitable value of $h_1$ for a nominal thermal lensing, and subsequent determinations of changes in $h_1$ required to compensate for changes in thermal lensing are relatively straightforward. It should be noted, however, that while the thermal-lensing compensation arrangement of optical system 61 may be as effective in compensating for thermal-lensing variations as optical system 58 of FIG. 9, optical system 61 requires that precise alignment of mirror 34B be maintained during translation, and, because of this, is the more difficult to implement in practice. It should further be noted that while above-described thermal lensing compensation arrangements have been described in the context of a laser system in accordance with the present invention including two or more different gain media, the compensation arrangements are equally applicable to resonators including only one gain-medium, two or more rods of the same gain-medium and any mode of laser operation in which thermal lensing in a gain medium or other optical element may limit operational flexibility of the laser.

In conclusion, a continuously-pumped, repetitively-pulsed, Q-switched laser resonator including two or more different gain-media which lase at about the same wavelength is described above. By separately and variably pumping the different gain-media, the laser resonator can efficiently generate output radiation having parameters which stay constant over a much wider range of pulse-repetition frequency than would be possible were either one of the gain-media solely deployed in the resonator. In two preferred embodiments, the laser resonator includes arrangements for providing near real-time compensation for variations in thermal-lensing in the gain-media resulting from variations in pump-power or pulse-repetition frequency.

The present invention has been described and depicted in terms of a preferred and other embodiments. The application is not limited, however, to those embodiments described and depicted. Rather the application is defined by the claims appended hereto.

What is claimed is:

1. A continuously-pumped, repetitively-pulsed laser comprising:

a laser resonator;

said laser resonator terminated at opposite ends thereof by first and second mirrors and including first and second solid-state gain materials said first and second gain materials separately pumped by respectively first and second pump-light sources;

said first and second gain materials each having a lasing wavelength about equal to a selected wavelength, and having respectively first and second characteristic lifetimes and first and second gain cross-sections, at least one of said characteristic lifetimes and said gain cross-sections being different from the other; and design characteristics of said resonator and output from said first and second pump light sources being selected such that said resonator lases at the selected wavelength with a pulse-repetition frequency dependent output parameter which is intermediate first and second corresponding output parameters which would be obtained if the resonator included respectively only one said first and second gain materials.

2. The laser of claim 1, wherein said frequency-dependent parameter is at least one of energy-per-pulse, peak power, and average power.

3. The laser of claim 1, wherein said frequency-dependent parameter is the product of peak and average power.

4. The laser of claim 1, wherein said first and second gain materials are Nd:YAG and Nd:YVO$_4$ respectively.

5. The laser of claim 4, wherein said frequency-dependent parameter is at least one of energy-per-pulse, peak power, and average power.

6. The laser of claim 4, wherein said frequency-dependent parameter is the product of peak and average power.

7. The laser of claim 1 wherein output of said first and second pump light sources is separately variable.

8. The laser of claim 1 wherein said first and second gain materials have pump-power-dependent thermal lensing characteristics, and wherein said laser resonator further includes a positive lens located therein between said first mirror and said gain materials, separation between said first mirror and said lens being variable for compensating for variations in said thermal lensing characteristics.

9. A continuously-pumped, repetitively-pulsed laser for providing pulsed laser radiation at a selected wavelength, comprising:

a laser resonator;

said laser resonator including first and second solid-state gain materials, said first and second gain materials separately pumped by respectively first and second pump-light sources;

said first and second gain materials each having a lasing wavelength about equal to a selected wavelength, and having respectively first and second characteristic lifetimes and first and second gain cross-sections, at least one of said characteristic lifetimes and said gain cross-sections being different from the other; and design characteristics of said resonator and output from said first and second pump light sources being selected such that the said resonator provides output pulses having about the selected wavelength, the product of peak power and average power of said output pulses as a function of pulse-repetition frequency having a maximum value at first pulse-repetition frequency, said first pulse-repetition frequency being between second and third pulse-repetition frequencies, said first and second pulse-repetition frequencies being those pulse-repetition frequencies at which maximum values of the same function would be obtained if said resonator included respectively only one said first and second gain materials.

10. The laser of claim 9 wherein said first and second gain materials are respectively Nd:YAG and Nd:YVO$_4$ and said selected wavelength is about 1.06 micrometers.

11. The laser of claim 9, further including a non-linear optical crystal located outside of said resonant cavity and arranged to receive said extracted laser-radiation for doubling the lasing frequency thereof.

12. The laser of claim 11 wherein said first and second gain materials are respectively Nd:YAG and Nd:YVO$_4$ and said selected wavelength is about 1.06 micrometers.

13. The laser of claim 9, wherein output of said first and second pump-light sources is independently variable for varying the power of pump-light delivered thereby to respectively said first and second gain materials and thereby selectively varying said first pulse-repetition frequency.

14. The laser of claim 13 wherein said first and second gain materials are respectively Nd:YAG and Nd:YVO$_4$ and said selected wavelength is about 1.06 micrometers.

15. The laser of claim 13, further including a first non-linear optical crystal located outside of said laser resonator and arranged to receive said output pulses for doubling the lasing frequency thereof, thereby providing frequency-doubled output-pulses.

16. The laser of claim 15, further including a second non-linear optical crystal located outside of said laser resonator and arranged to receive and mix output-pulses from said laser resonator and frequency-doubled output-pulses from said first non-linear optical crystal.

17. The laser of claim 13 wherein said first and second gain materials have pump-power-dependent thermal-lensing characteristics, and wherein said laser resonator further includes a positive lens located therein between said first mirror and said gain materials, separation between said first mirror and said lens being variable for compensating for variations in said thermal lensing characteristics.

18. A continuously-pumped, repetitively-pulsed laser system for providing pulsed laser radiation at a wavelength of about 355 nanometers by frequency-tripling pulsed laser radiation having a fundamental wavelength of about 1.06 micrometers:

a laser resonator, said laser resonator formed between first and second mirrors and including first and second solid-state gain materials, said first and second gain materials being respectively Nd:YAG and Nd:YVO$_4$;

said first and second gain materials separately pumped by respectively first and second pump-light sources, output of said first and second pump-light sources being independently variable for varying the power of pump-light delivered thereby to respectively said first and second gain materials;

design characteristics of said resonator and output from said first and second pump light sources being selected such that said laser resonator provides output-pulses having a fundamental lasing-frequency corresponding to a fundamental wavelength, the product of peak power and average power of said output pulses as a function of pulse-repetition frequency having a maximum value at a selected pulse-repetition frequency, said selected pulse-repetition frequency having a value in a range between about 7 KHz and 25 KHz, said value being variable within said range by varying the relative powers of pump-light delivered to said first and second gain materials;

a first optically non-linear crystal located outside said laser resonator for receiving said output-pulses and converting said output pulses into frequency-doubled pulses having twice the fundamental frequency; and a second optically non-linear crystal located outside said laser resonator for receiving and mixing said frequency-doubled pulses and said output-pulses having said fundamental frequency thereby providing frequency-tripled pulses hating a wavelength of about 355 nanometers.

19. The laser of claim 18 wherein said first and second gain materials have pump-power-dependent thermal-lensing characteristics, and wherein said laser resonator further includes a positive lens located therein between said first mirror and said gain materials, separation between said first mirror and said lens being variable for compensating for variations in said thermal-lensing characteristics.

20. A continuously-pumped, repetitively-pulsed laser, for providing laser output-pulses of a selected wavelength comprising:

a laser-resonant cavity;

first and second solid-state gain-media disposed in said resonant cavity, the solid-state gain-media being different, one from the other but each having a lasing wavelength about equal to the selected wavelength;

first and second pump-light sources arranged to, independently and variably, continuously optically-pump respectively said first and second gain-media;

a Q-switch located in said resonant cavity; and said first and second pump-light sources and said Q-switch operable such that laser output-pulses having said selected wavelength are provided, said laser output-pulses having one or more pulse-frequency dependent parameters selectively variable within first and second limiting ranges thereof, said first and second limiting ranges characteristic of respectively said first and second gain-media alone.

* * * * *